US011263657B2

(12) United States Patent
Glasson

(10) Patent No.: US 11,263,657 B2
(45) Date of Patent: Mar. 1, 2022

(54) SYSTEMS AND METHODS FOR IMPROVED BRAND INTERACTION

(71) Applicant: ALLT TECHNOLOGIES PTY LTD, NSW (AU)

(72) Inventor: David Glasson, NSW (AU)

(73) Assignee: ALLT TECHNOLOGIES PTY LTD, Annandale (AU)

( * ) Notice: Subject to any disclaimer, the term of this patent is extended or adjusted under 35 U.S.C. 154(b) by 0 days.

(21) Appl. No.: 16/310,323

(22) PCT Filed: Jun. 23, 2017

(86) PCT No.: PCT/AU2017/050646
§ 371 (c)(1),
(2) Date: Dec. 14, 2018

(87) PCT Pub. No.: WO2017/219095
PCT Pub. Date: Dec. 28, 2017

(65) Prior Publication Data
US 2019/0259052 A1    Aug. 22, 2019

(30) Foreign Application Priority Data

Jun. 24, 2016 (AU) ................................ 2016902482

(51) Int. Cl.
*G06Q 30/02* (2012.01)
*H04L 65/60* (2022.01)
(Continued)

(52) U.S. Cl.
CPC ..... *G06Q 30/0239* (2013.01); *G06Q 30/0241* (2013.01); *G06Q 30/0269* (2013.01);
(Continued)

(58) Field of Classification Search
CPC .......... G06Q 30/0239; G06Q 30/0241; G06Q 30/0269; H04L 65/604; H04N 21/23424; H04N 21/4784
See application file for complete search history.

(56) References Cited

U.S. PATENT DOCUMENTS

2010/0293598 A1* 11/2010 Collart ............. H04N 21/64753
726/3
2012/0166584 A1*  6/2012 Kwon ..................... H04L 67/16
709/217

(Continued)

OTHER PUBLICATIONS

"UPnP Device Architecture" (Pillai, Vysakh, published Jan. 25, 2013 at https://embeddedinn.xyz/articles/tutorial/upnp-device-architecture/) (Year: 2013).*

*Primary Examiner* — James M Detweiler
(74) *Attorney, Agent, or Firm* — WPAT, P.C., Intellectual Property Attorneys; Anthony King

(57) ABSTRACT

Systems and methods for improved brand interaction including a method for brand promotion comprising the steps of: receiving a media broadcast signal comprising a media signal and a unique promotion code with a media receiver; reading said unique promotion code from said media broadcast; broadcasting said promotion code using a communication network associated with the media receiver; receiving the promotion code with a computing device; correlating the promotion code with a promotion database; receiving social link data from the promotion database; wherein the computing device is adapted to provide user engagement with the link data.

12 Claims, 7 Drawing Sheets

(51) Int. Cl.
*H04N 21/234* (2011.01)
*H04N 21/4784* (2011.01)
(52) U.S. Cl.
CPC ..... *H04L 65/604* (2013.01); *H04N 21/23424* (2013.01); *H04N 21/4784* (2013.01)

(56) References Cited

U.S. PATENT DOCUMENTS

2014/0037132 A1* 2/2014 Heen ................. H04N 21/4722
 382/100
2017/0272824 A1* 9/2017 Bunner ................. H04W 8/005

\* cited by examiner

SYSTEMS AND METHODS FOR IMPROVED BRAND INTERACTION

FIELD OF THE INVENTION

The present invention relates to systems and methods for promoting increased brand awareness and enabling a viewer consuming media content to engage in increased brand interaction and in particular to applications for promoting increased brand awareness and enabling a viewer consuming media content to engage in increased brand interaction via computing devices.

The invention has been developed primarily for use in methods and systems for providing a means for broadcasters and/or business providers to promote increased brand awareness and enabling a viewer consuming media content to engage in increased brand interaction between a consuming media content and the media program being viewed, in particular via computing devices connected to a network which is also committed to a media receiver adapted to receive and deliver the media content to the viewer and will be described hereinafter with reference to this application. However, it will be appreciated that the invention is not limited to this particular field of use.

BACKGROUND

Any discussion of the background art throughout the specification should in no way be considered as an admission that such background art is prior art nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

Declining TV and music company revenues is causing great concerns for traditional media companies. Piracy is practically impossible to prevent, and the addition of streaming media, online content and recorded programs is rendering advertising less relevant and lucrative. The traditional model for both industries is in urgent need of change yet no solution is presented itself to either industry.

Additionally, modem advertising is largely an attempt to cause the viewer to engage with the product being advertised—usually online—the primary function of most advertising models involves a 'search for X term' or 'log onto Y website'. Commonly social media penetration is becoming more relevant in live TV, for example: the Q and A television program broadcast by the Australian Broadcasting Corporation (ABC) network; or late-night talk show hosts, for example Jimmy Fallon, encouraging weekly themes for their viewers to engage with the program content for example via Facebook™ by interactions with the talk-show's profile page or Twitter™ via tweet hashtags for the viewers to use.

There is also currently little flow on benefit for a broadcaster with respect to advertising broadcast through their infrastructure. This is especially the case when a secondary product associated with an advertisement inspires a later purchase from a viewer. For example, where a viewer is motivated to purchase a red bikini initially seen in a Coca-Cola advertisement worn by a model, or a pair of shoes worn by a music personality in a music video clip. The actual purchase by the viewer results in no commercial gain for the point of inspiration broadcaster or content creator.

SUMMARY

There is provided a method for brand promotion comprising the steps of:
receiving a media broadcast signal comprising a media signal and a unique promotion code with a media receiver;
reading said unique promotion code from said media broadcast signal;
broadcasting said promotion code using a communication network associated with the media receiver;
receiving the promotion code with a computing device;
correlating the promotion code with a promotion database;
receiving social link data from the promotion database;
wherein the computing device is adapted to provide user engagement with the social link data.

There is provided a method for brand promotion comprising the steps of:
receiving a broadcast signal comprising a unique promotion code with a computing device;
reading said unique promotion code from said broadcast signal;
correlating said unique promotion code with a promotion database;
receiving social link data from said promotion database;
wherein said computing device is adapted to provide user engagement with the social link data.

Said broadcast signal is a local broadcast signal.

The local broadcast signal is associated with a local network.

Said local network is a local wireless network.

The media broadcast signal comprises a television broadcast signal; and the media receiver comprises a tuner module adapted to receive said television broadcast signal.

The media receiver comprises a processing module adapted to extract said unique promotion code from within said media broadcast signal.

Said media receiver comprises a wireless networking broadcast module adapted to connect said media receiver to a network.

Said networking broadcast module is adapted to broadcast a networking signal via a local network, said networking signal comprising a setting in relation to the local network, said setting being unique to said media receiver.

Said networking broadcast module is further adapted to broadcast a broadcast signal to said local network, said broadcast signal comprising said unique promotion code.

Said processing module is adapted to combine said promotion code and said setting to form a modified setting in relation to the local network; and
said broadcast module is adapted to broadcast a networking signal comprising said modified setting via said local network.

Said computing device comprises a network receiver module adapted to receive and interpret said broadcast signal.

Said computing device comprises a processor adapted to:
interpret said broadcast signal in order to extract said unique promotion code from said modified setting in relation to the local network;

query a lookup database to correlate said unique promotion code with promotion data.

Said database comprises said promotion data.

Said computing device is further adapted to receive said promotion data from said database.

Said promotion data comprises social link data.

The promotion code is uniquely associated with the media program at the time of creation of the media program.

The promotion code comprises a plurality of promotion code segments, wherein at least one promotion code segment is unchangeable.

The promotion code comprises a plurality of promotion code segments, wherein at least one promotion code segment is permanently encoded in metadata associated with the media program.

The promotion code comprises an editable promotion code segment adapted to be edited to comprise a broadcaster promotion code uniquely associated with a media broadcaster.

A media broadcaster is adapted to broadcast the media signal and the associated promotion code, and wherein the broadcaster is further adapted to simultaneously broadcast a further broadcast signal comprising a broadcaster promotion code uniquely associated with the broadcaster.

A processing module of said media receiver is adapted to combine the promotion code and the broadcaster promotion code to form a modified setting in relation to the local network for broadcast via said local network by said networking broadcast module.

The setting or the modified setting comprises a Service Set Identifier (SSM) associated with the media receiver, wherein the media receiver acts as an access point in a wireless local area network that operates under an IEEE 802.11 architecture.

The setting or the modified setting comprises an identifier that identifies the media receiver, wherein the media receiver acts as a network element in a zero configuration network that operates under one of zero configuration protocols including Universal Plug and Play (UPnP), Alljoyn, Bonjour.

There is provide a computer program product having a computer readable medium having a computer program recorded therein for brand promotion, said computer program product comprising:

computer program code means for receiving a media broadcast signal comprising a media signal and a unique promotion code with a media receiver computer program code means for reading said unique promotion code from said media broadcast signal;

computer program code means for broadcasting said promotion code using a communication network associated with the media receiver, There is provided a computer program for brand promotion, said program comprising:

code for receiving a media broadcast signal comprising a media signal and a unique promotion code with a media receiver code for reading said unique promotion code from said media broadcast signal; and code for broadcasting said promotion code using a communication network associated with the media receiver.

There is provided a computer program element comprising computer program code means to make a computer or network connected device execute a procedure to enable brand promotion as described above.

There is provided a computer readable medium, having a program recorded thereon, where the program is configured to make a computer execute a procedure to enable brand promotion as described above.

There is provide a method of providing a modified setting in relation to a local network for a network-enabled media receiver, said network-enabled media receiver comprising a tuner module adapted to receive a media broadcast signal, the method comprising the steps of:

receiving said media broadcast signal comprising a media signal and a promotion code with the network-enabled media receiver;

reading said promotion code from said media broadcast signal; and modifying a setting in relation to the local network in accordance with said promotion code to provide the modified setting in relation to the local network.

Said promotion code is uniquely associated with said media broadcast signal.

Said network-enabled media receiver comprises a processing module adapted to extract said promotion code from within said media broadcast signal.

Said modified setting in relation to the local network comprises a modified device identifier, wherein the modified device identifier comprises said promotion code either appended or prepended to said setting.

Said modified device identifier comprise a delimiter character intermediate an existing device identifier and said promotion code.

The modified device identifier comprises a Service Set Identifier (SSID) associated with the network-enabled media receiver, wherein the network-enabled media receiver acts as an access point in the local network that operates under an IEEE 802.11 architecture.

The modified device identifier comprises an identifier that identifies the network-enabled media receiver, wherein the network-enabled media receiver acts as a network element in the local network being a zero configuration network that operates under one of zero configuration protocols including Universal Plug and Play (UPnP), Alljoyn, Bonjour.

There is provided a computer program product having a computer readable medium having a computer program recorded therein for providing a modified setting in relation to a local network for a network-enabled media receiver, said computer program product comprising:

computer program code means for receiving a media broadcast signal comprising a media signal and a promotion code with said media receiver;

computer program code means for reading said promotion code from said media broadcast signal; and computer program code means for modifying a setting in relation to the local network in accordance with said promotion code.

There is provide a computer program for providing a modified setting for a network-enabled media receiver, said program comprising:

code for receiving a media broadcast signal comprising a media signal and a promotion code with said media receiver;

code for reading said promotion code from said media broadcast signal; and code for modifying a setting in relation to the local network in accordance with said promotion code.

There is provided a computer program element comprising computer program code means to make a computer or network connected device execute a procedure to provide a modified setting for a network-enabled media receiver as described above.

There is provided a computer readable medium, having a program recorded thereon, where the program is configured to make a computer execute a procedure to provide a modified setting in relation to a local network for a network-enabled media receiver as described above.

There is provided a method for enabling social engagement with a media broadcast comprising the steps of:

providing a mobile computing device comprising a network connection module, said mobile computing device adapted to connect to a local network and to receive a modified setting in relation to the local network;

wherein said mobile computing device comprises a mobile processor adapted to identify a promotion code within said modified setting.

Said mobile processor is adapted to poll a database and to retrieve promotion data associated with said promotion code.

Said mobile computing device is adapted to make said promotion data available to a user of said mobile computing device for utilisation in connection with a social media network.

Said processor is adapted to monitor said modified setting and to extract the promotion code from said modified setting.

Said mobile computing device is adapted to monitor said modified setting in real-time or near-real-time and to update said promotion code in accordance with changes in the modified setting.

There is provided a computer program for enabling social engagement with a media broadcast, said program comprising:

code for receiving a media broadcast signal comprising a media signal and a promotion code with said media receiver code for reading said promotion code from said media broadcast signal; and code for modifying an existing setting in relation to a local network in accordance with said promotion code.

There is provided a computer program product having a computer readable medium having a computer program recorded therein for enabling social engagement with a media broadcast, said computer program product comprising:

computer program code means for receiving a setting in relation to a local network;

computer program code means for polling a database and to retrieve promotion data associated with said promotion code; and computer program code means for making said promotion data available to a user of said mobile computing device for utilisation in connection with a social media network.

There is provided a computer program element comprising computer program code means to make a computer or network connected device execute a procedure to enable social engagement with a media broadcast as described above.

There is provided a computer readable medium, having a program recorded thereon, where the program is configured to make a computer execute a procedure to enable social engagement with a media broadcast as described above.

There is provided a modified device identifier associated with a media device comprising:

a first unique device identifier portion associated with said media device; and a second device identifier portion comprising a promotion code extracted from a media broadcast signal received by a tuner module associated with said media device, said promotion code being unique to said media broadcast signal.

Other aspects of invention are also envisioned as described in the Detailed Description section of the present specification below.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which.

DEFINITIONS

Figure 1:
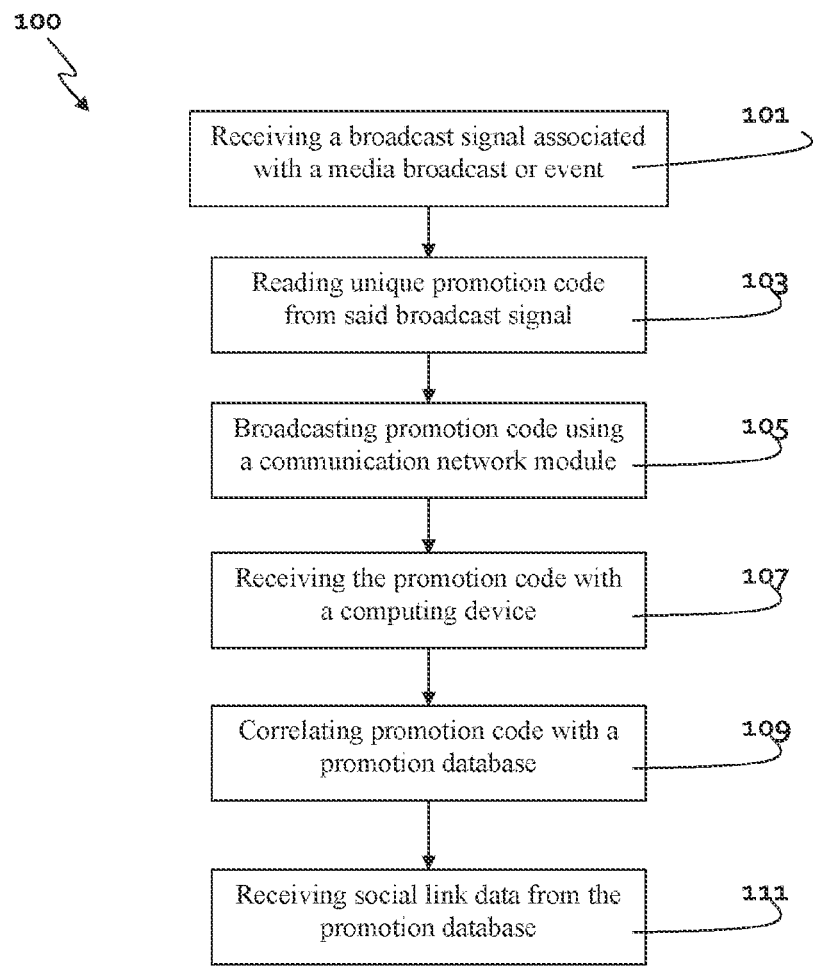
FIG. 1 shows a method 100 for brand promotion in accordance with a particular arrangement of the present invention.

The following definitions are provided as general definitions and should in no way limit the scope of the present invention to those terms alone but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 20%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

The term, "real-time", for example "displaying real-time data," refers to the display of the data without intentional delay, given the processing limitations of the system and the time required to accurately measure the data.

The term "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

The term 'broadcast' in the context of the present specification is taken to include all forms of real-time media content delivery. Broadcasting, as used herein, is the distribution of audio and/or video content to a dispersed audience via any electronic mass communications medium, but typically one using the electromagnetic spectrum (radio waves), in a one-to-many model. Transmission of radio and television programs from a radio or television station to home receivers over the spectrum is generally referred to as OTA (over the air) or terrestrial broadcasting. Transmissions using a combination of satellite and wired transmission, such as cable television (which also retransmits OTA stations with their consent), are also considered broadcasts. Transmissions of television and radio via streaming digital technology have increasingly been referred to as broadcasting and in the present specification are defined to be included in the general term "broadcasting". In this many, broadcasting as used herein is also taken to include transmission of media content in a one-to-one scenario where the media contend is delivered to the digital receiver (e.g. computing device or network connected device such as a network connected television or the like) of a user of a digital media streaming service provider.

Accordingly, the term 'broadcast' as used herein includes all forms of:

Free-space broadcast technology (e.g. OTA broadcast technologies such as those commonly utilised by a television or radio broadcaster); and Digital media streaming e.g. over a public network such as the internet for example, Netflix™, or YouTube™ streaming media services or the like.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," When used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one. B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DETAILED DESCRIPTION

It should be noted in the following description that like or the same reference numerals in different embodiments or arrangements denote the same or similar features.

Referring to FIG. 1 there is provided a method 100 for brand promotion. The method 100 comprises inserting a unique promotion code into a broadcast signal such as a television broadcast or media adapted to be consumed by a viewer through alternative avenues, such as, for example, video media uploaded onto a video streaming service such as YouTube™, or available over video streaming services such as, for example Netflix™, Hulu™ or the like.

Where the media program is broadcast using OTA technologies, the broadcast signal is received by a broadcast tuner in the television tuner module in the form of a media device, also referred to as a media receiver, such as for example a television with an inbuilt timer module or a dedicated set-top-box-style tuner. Alternatively, where the media program is broadcast over digital or streaming methods, the media device may comprise an application program particularly adapted for viewing such digital media, for example, a video player installed on the media device. In this example, the media device can be a desktop computer, a laptop computer, a mobile computing device, or a television with the capability of receiving the media program broadcast over digital or streaming methods. Examples of the application programs include Windows™ Media Player™ and the like.

The media device is further adapted to decode the promotion code embedded in the metadata of the media program being played. Once the promotion code is decoded, the media device may store the promotion code in memory for later retrieval.

Additionally, the media device sends the promotion code to a computing device used by a user who is viewing the media program by for example broadcasting the promotion code to the computing device using a communication network module. It should be noted that there are different ways of broadcasting the promotion code to the computing device used by the user, examples of which are described below.

The media device modifies one or more settings in relation to a local network based on the promotion code to generate one or more modified settings in relation to the local network with the promotion code included in the one or more modified settings. For example, the media device can generate a new setting for the promotion code. The media device can also combine the promotion code and an existing setting to form the modified setting. The one or more modified settings including the promotion code are broadcast to the computing device according to the network protocol(s) under which the media device and the computing device operate. Upon receipt of the one or more modified settings at the computing device the computing device extracts the promotion code from the one or more modified settings. Some example settings in relation to the local network are describe below.

If the media device acts as an access point in a wireless local area network that operates under the IEEE 802.11 WLAN architecture, the media device periodically broadcasts one or more setting in relation to the wireless local area network to the computing device via Beacon frames. A Beacon frame under the IEEE 802.11 WLAN architecture includes multiple fields including timestamp, beacon interval, capability information, a Service Set Identifier (SSID) associated with the media device that serves as a device identifier that identities the media device in the wireless local area network, etc. The values of fields represent one or more settings in relation to the wireless local area network under the IEEE 802.11 WLAN architecture. The media device modifies an appropriate field of the Beacon frame by for example including the promotion code in the value of the field of the Beacon frame in order to broadcast the modified value of the field including the promotion code to the computing device. As an example, the media device includes the promotion code in the value of the capability information field of the Beacon frame. As another example, the media device modifies the existing SSID contained in the SSID filed of the Beacon frame by for example incorporating the promotion code in the existing SSID to generate a modified SSID associated with the media device in the SSID field of the Beacon frame. This way, upon receipt of the Beacon frame at the computing device in the vicinity of the media device, the computing device identifies the media device as the access point under the IEEE 802.11 WLAN architecture and extracts the promotion code from the modified settings in the Beacon frame, particularly, the capability information field or the modified SSID contained in the SSID field.

If the media device acts as a network element (for example, a control point) in a zero configuration network that operates under one of zero configuration protocols including Universal Plug and Play (UPnP), Alljoyn, Bonjour, etc., the media device broadcasts the promotion code to the computing device in accordance with the respective processes under these zero configuration protocols, Take the UPnP protocol as an example, the media device publishes an UPnP device description file in accordance with the General Event Notification Architecture (GENA). The UPnP device description file includes multiple variables and their values, which represent the settings in relation to the IMO network. The media device may modify the settings by generating a new variable "Promotion code" and setting its value as the promotion code decoded by the media device from the media program. As another example, the media device modifies the value of one of the existing variables. For example, the media device modifies the value of variable "Device Name", which is the name of the media device and serves as a device identifier associated with the media device that identifies the media device in the UPnP network. Particularly, the media device modifies the existing name of the media device by incorporating the promotion code in the existing name to generate a modified name of the media device as the value of the variable "Device Name" in the UPnP device description file published by the media device. Once the UPnP device description file is published, the computing device used by the user in the vicinity of the media device receives an event message that includes the UPnP device description file. This way, the computing device extracts the promotion code by reading the value of the variable "Promotion code" or "Device Name" in the UPnP device description file.

Upon receipt of the promotion code at the computing device, the promotion code may be exported to a browser application installed on the computing device such that the browser application may accept the promotion code; query the promotion database and receive social link data from the promotion database such as to enable user engagement with the link data within the browser application.

As described above, the decoding of the promotion code from a media broadcast (including media streaming) would require updates to the software code or firmware of the media receiver (i.e. the tuner device of a television set or the video player application installed on a computing device) to enable the media receiver to decode the embedded promotion code and to interact with other application programs or network connection modules associated with the media receiver in order to modify one or more settings in relation to the local network (e.g. the capability information or the device identifier of the media receiver under the IEEE 802.11 WLAN architecture or the value of the variable "Promotion Code" or "Device Name" under the UPnP protocols) or to query the promotion database directly. It is envisaged that hardware providers (e.g. television tuner manufacturers) or application developers would develop a software or firmware upgrade to their hardware and/or application programs in order to decode a promotion code embedded in the metadata of a broadcast media program. Such hardware, firmware, and/or application software updates would be readily appreciated by the skilled addressee.

The promotion code is unique to a particular media program, for example, a movie, a television show, or advertisement. In preferred arrangements, the promotion code comprises at least a first promotion code segment that is permanently and uniquely associated with the particular media program. The first promotion code segment may be unchangeable once initially associated with a particular media program. The first promotion code segment is envisaged to be associated with the media program at the time of creation of the media program and embedded into the metadata associated therewith.

In preferred arrangements, the media device comprises a processing module adapted to read the unique promotion code associated with a broadcast signal being received and to broadcast that unique promotion code to a local network so that it can be received by a mobile computing device being operated by a viewer watching the broadcast program and/or one or more users in the vicinity of the media receiver.

The mobile computing device is adapted to receive the broadcast promotion code and to query a promotion database for promotion data associated with the unique promotion code. The computing device is further adapted to receive the promotion data and to make it available to the user for the purpose of interacting with the media broadcast via one or more social networks, for example Facebook™, Twitter™, Instagram™, Pinterest™ and the like or to find products for sale on large marketplaces such as Amazon™ or Ebay™ or individual seller sites accessible via the internet.

For example, the viewer may be watching a reality-style television program such as for example MasterChef. The broadcast signal being broadcast by the television network may comprise a promotion code which is unique to the particular episode of MasterChef being broadcast. As an example, promotion code may be of the form of "#MasterChef_S1Ep5#" or alternatively the promotion code may be a unique numeric value associated with the particular episode of broadcast. The promotion code is associated with a promotion database that may be available on a network accessible computing device such as, for example a cloud server or the like, wherein the database is able to be accessed via a public network such as the Internet. In this particular example, the promotion code may be associated with promotion data in the database which may comprise any one or more of:

links to associated Facebook pages;
Twitter handles of the program presenters and/or contestants;
Twitter hashtag identifiers (hashtags, e.g. of the form #MasterChef) associated with the program or program content to be used in the usual manner of associating a tweet by a user by the social media network Twitter along a common theme associated with the hashtag identifier;
Facebook pages;
Twitter handles;
Instagram™ profiles;
hashtags associated with official sponsors associated with the program; or links to internet-accessible web pages related to the content of the media broadcast, for example, official web pages of the media program, broadcaster or the like, or, additionally or alternatively, links to internet-accessible web pages adapted for purchase of one or more items present in the media program; or the like.

For example, in a Coca-Cola advertisement, an associated promotion code may provide a user with promotion data relating to: the main website for the Coca-Cola company; a product website associated with a product featured in the advertisement; social media link data associated with the Coca-Cola company, the featured product or products, or actors or personalities appearing in the advertisement; links to websites adapted for purchase of items appearing in the advertisement for example cars, clothing, etc.

Referring to FIG. 1, the method 100 comprises receiving 101 a broadcast signal associated with a media broadcast or event, the broadcast signal comprising a media signal and a unique promotion code with a media receiver. The method 100 further comprises reading 103 the unique promotion code from the media broadcast. The method further comprises broadcasting 105 said promotion code using a communication network module associated with the media receiver. The method further comprises 107 receiving the promotion code with a computing device. The method further comprises 109 correlating the promotion code with a promotion database. The computing device comprises a processor adapted to query the promotion database utilising a public network such as the internet to correlate the promotion code to social and or link data associated with the media program or event. The method further comprises receiving 111 social link data associated with the promotion code from the promotion database.

The computing device may be, for example, mobile computing device such as a smart phone or tablet device, or a personal computing device such as a desktop or laptop computer adapted to provide user engagement with the link data. In further arrangements, the computing device may be a network connected device, for example a computer, device or appliance that is connected to a network such as the internet e.g. an Internet-of-Things (IoT) device.

In particular arrangements, the software application stores historical promotion data accessed by the computing device in a non-volatile memory module of the computing device such that the software application can facilitate retrospective searching of the promotion data history accessed by the device thereby to enable a user to access the promotion data of a media program or event viewed in the past and to obtain the promotion data associated with that past media program or event in which to be able to utilise the past promotion social media and link data for engagement with the brand in accordance with the methods disclosed herein.

In further arrangements, the historical promotion data is stored in non-volatile memory associated with either the media receiver or the computing device, or both. Alternatively or additionally, the historical promotion data may be stored in a cloud-based computing server and associated with a user access account, wherein a user is permitted to access the historical data on demand by accessing their associated user access account. In further arrangements still, the media receiver may be configured to re-broadcast all or a selection of the historical promotion data that the receiver has accessed and stored in memory. The media receiver may rebroadcast the historical promotion data periodically or on demand in response to a request from a user. In particular arrangements, the media receiver may rebroadcast all the historical promotion data on detection of a mobile computing device reconnecting to the network after a period of absence.

In an example arrangement comprising an IoT device, a user watching a cooking show, may provide an indication that they 'like' a particular recipe such that an internet connected smart-fridge may be configured to either order the goods required for the recipe or to determine which goods are not already in the user's pantry by talking to the media receiver device and order the missing and/or required goods automatically; or the media receiver may send the video of the recipe to a display screen embedded in a fridge directly; or sending the recipe directly to an automated cooking appliance such as, for example a Thermomix™ device; alternatively, an internet-connected appliance such as a fridge may comprise memory for storage of historical promotion codes so a user is empowered to be able to open their fridge or pantry and scan through the various recipes they had watched on cooking shows over a selectable historical time period to determine whether the pantry and/or fridge had the required ingredients for one of the recipe's in the device history such that the device may be configured to provide recommendations of dishes that the user could prepare on the basis of foodstuffs available at hand; or possibly a user starts watching a clip of a recipe on a computer in their kitchen, they could send instructions directly to their oven over to pre-heat itself based on the necessary requirement of the particular recipe that they are watching; among many other use cases as would be appreciated by the skilled addressee.

In particular arrangements of the method 100, the user engagement with link data is provided in the form of a selectable list of identifiers including for example hashtags, social media user identifiers or links to webpages associated with the content of the media broadcast. Using the link data, the user is able to interact with one or more social communities on a social network utilising the specific social media identifiers associated with the program being watched. For example, the computing device may comprise a software application installed thereon adapted for receiving the link data wherein the software application is adapted to interact with one or more social media specific software programs also installed on the users computing device such that the user is able to select appropriate data for a particular interaction on their social media platform of choice. Alternatively, the user may choose to, using their Internet web browser of choice, visit a web page link provided in the link data associated with a particular product or entity associated with the media program being watched by the user.

In particular arrangements, the media receiver comprises a processing module adapted to extract the promotion code embedded within the media broadcast signal being received by the tuner module.

In preferred arrangements, the promotion code is embedded into the media content at the time of creation thereof. In particular arrangements, the promotion code embedded at the time of creation of the media remains permanently embedded in the metadata associated with the media content across all forms of content delivery, e.g. broadcast media delivery, streaming media delivery, digital media download, or physical media delivery (e.g. DVD, Blu-Ray and the like). Such permanent attachment of the promotion code to the media content ensures that the content creator is always identifiable from the promotion code and thus able to receive a commission from any sales (e.g. merchandise or other similar promotional sales) associated with the media content.

In particular arrangements, the promotion code may be provided with a plurality of promotion code segments. A first promotion code segment may be permanently fixed and unchangeable. The first promotion code segment may be associated particularly to the content of the media program.

In further particular arrangements, the promotion code may further comprise a second promotion code segment. The second promotion code segment may be editable by a media broadcast provider, such as a television network broadcaster or media streaming service. In this arrangement, the broadcast provider is provided the ability to modify the second promotion code segment for identification purposes of the broadcast provider. Each promotion code segment may be separated by a predetermined delimiter character. For instance, an example promotion code comprising a plurality of promotion code segments, may take the appearance of "1234.7". In this example the first segment of the promotion code comprises the numerals "1234". This segment would be fixed and unchangeable in relation to its association with the particular media program. The example promotion code includes a delimiter character, in this case ".". Any delimiter character may be used as would be appreciated by the skilled addressee. The example promotion code then comprises a second promotion code segment, "7". In this example, the second promotion code may be editable by the media broadcaster to include a unique broadcaster identifier. In this case the second promotion code segment "7" may be uniquely associated with broadcaster "Channel 7".

Each broadcast provider may be provided with a unique promotion code segment which may be selectively added by the broadcast provider to the promotion code associated with a particular media program which the provider broadcasts. Thus, when the broadcaster broadcasts the media program, the modified promotion code comprising the broadcaster specific segment is embedded into the broadcast.

In a particular arrangement, the promotion code associated with the particular media program may not comprise an editable portion. In this arrangement, the media broadcaster may broadcast the media program and the associated promotion code, and simultaneously broadcast a further broadcast signal comprising a broadcaster promotion code uniquely associated with the broadcaster.

In this arrangement, the processing module of the media receiver may be adapted to recognise both the promotion code comprised within the media program, and also the separately transmitted unique broadcaster promotion code. The processing module may further be adapted to combine the media program promotion code and the broadcaster promotion code to form a modified setting in relation to a local network, for example, a modified device identifier, particularly, a modified SSID, of the media receiver as an access point under the IEEE 802.11 WLAN architecture. The broadcast module may be adapted to broadcast a networking signal comprising the modified device identifier via the local network.

A particular advantage of associating a non-editable promotion code with a particular media program is in the field of piracy mitigation associated with the media program. For instance, the promotion code may be integrally incorporated into the metadata of the media program and thus the promotion code may be extremely difficult, if not impossible, to remove from the media program. Therefore, all copies of the media program, whether legitimate, legally purchased copies, or illegitimate, pirated copies, would each comprise the unique promotion code associated with the media program, e.g. incorporated into the program metadata at the time of creation of the media program. Therefore, the promotion code may be utilised in tracking and/or identifying illegitimate, pirated copies of the media program and thus may be beneficial in establishing a legal case against the possessor of a pirated copy of the media program, for example, for infringement of copyright or other legal rights associated with the copying and/or distributing of the media program without the permission of the rights holder.

In further arrangements, the promotion code may comprise an editable promotion code segment adapted to be edited to comprise a broadcaster promotion code uniquely associated with a media broadcaster. In this arrangement, the processing module of the media receiver may be adapted to recognise the promotion code comprised within the media program and to generate a modified setting in relation to a local network, for example, a modified device identifier or SSID in accordance with the promotion code. The broadcast module may be adapted to broadcast a networking signal comprising the modified setting via the local network.

Figure 2:
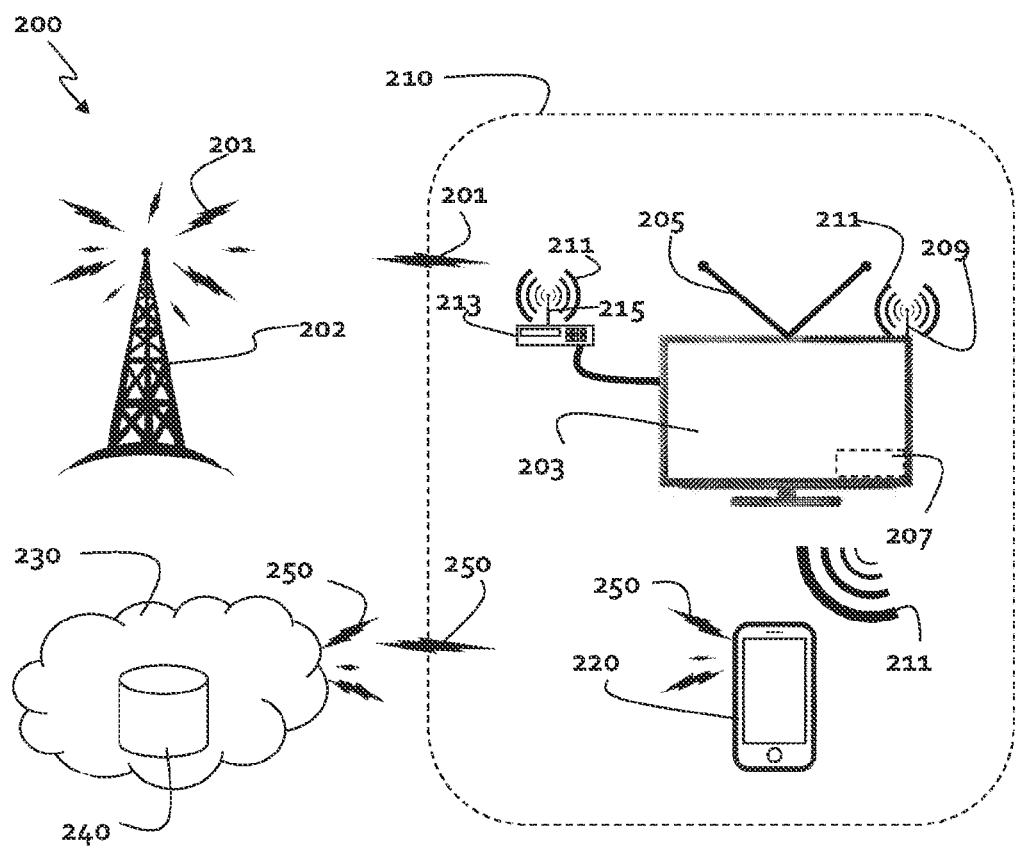
FIG. 2 shows a system 200 adapted in a particular arrangement to implement method 100 of FIG. 1.

Now to FIG. 2, there is shown a system 200 adapted to increase brand interaction of a media broadcast signal being viewed by a consumer with the aid of a media receiver. A media broadcast network transmits a broadcast signal 201 comprising media content e.g. television program or television advertisements, via broadcast tower 202. Broadcast signal 201 additionally comprises a promotion code unique to the particular media content being broadcast.

Broadcast signal 201 is received by an antenna 205 connected to a media device 203 such as a television set within a localised environment 210 such as a home residence serviced by a local network. Media device 203 comprises a processing module 207 including control electronics including for example a television signal tuner module and a processor adapted to process the incoming broadcast signal 201 received by antenna 205. Media receiver 203 further comprises a wireless networking broadcast module including a networking broadcast antenna 209 adapted to connect said media receiver to a local network and to communicate data over the local network via wireless signal 211. Wireless signal 211 may be broadcast to the local network via any suitable wireless network working protocol such as for example Bluetooth or IEEE 802.X (WIFE) wireless protocols, cellular networking protocols such as, for example LTE, HSDPA, GPRS, EV-DO, 3G, or 4G protocols, 60 GHz Protocols such as WirelessHD and WiGig, Wireless Home Automation Protocols such as Z-Wave and Zigbee, or the like.

Alternatively, the media receiver may be a set-top-box 213. In this particular arrangement processing module 207 may be implemented within set-top box 213 wherein the set-top box device 213 comprises networking broadcast antenna 215 adapted to broadcast wireless signal 211 and to communicate with the local network.

In particular arrangements, networking signal 211 comprise a setting in relation to the local network, e.g. device identifier example, the SSID of the media receiver 203 or 213 under the IEEE 802.11 architecture, or the device name of the media device 203 or 213 under UPnP protocols or the device identifiers under other zero configuration protocols), said setting or device identifier being unique to said media receiver (203 or 213). The broadcast signal 211 further comprises the unique promotion code.

Processing module 207 is adapted to combine the promotion code and the setting (for example, the device identifier) to form a modified setting in relation to the local network, for example, a modified device identifier or SSID associated media receiver (203 or 213). The broadcast module is adapted to broadcast networking signal 211 comprising the modified setting (for example, the modified device identifier or SSID) via the local network.

Whilst watching media broadcast 201 via media receiver (203 or 213), the viewer may desire to interact with the media broadcast via a computing device 220, for example a mobile computing device such as a smartphone or tablet device alternatively a personal computer. Computing device 220 comprises a network receiver module (not shown) adapted to receive and interpret local network broadcast signal 211. Computing device 220 comprises a computing device processor adapted to: interpret local network broadcast signal 211 to extract the unique promotion code from the modified setting for example, the modified device identifier associated with the media receiver (203 or 213). It should be noted that the computing device 220 does not need to be actually connected to the local wireless network provided by the media receiver, whether it be an IEEE 802.11 network or a zero configuration network. The computing device 220 just needs to be able to receive and interpret broadcast signal 211 including the modified setting (for example, the modified device identifier or SSID) in order to extract the unique promotion code from the modified setting. Computing device processor is adapted to query a lookup database such as promotion database 240 to correlate the unique promotion code with promotion data comprised in promotion database 240. Promotion database 240 is advantageously comprised on a network accessible computing device such as, for example cloud server 230 or the like, wherein promotion database 240 is able to be accessed via a public network such as the Internet 250.

The computing device 220 is further adapted to receive the promotion data from promotion database 240. The promotion data may comprise social link data.

Once computing device 220 receives the promotion data, the computing device is adapted to make the promotion data and social link data comprised therein available to the viewer for the purpose of interacting with the media broadcast via a selected preferred social media network such as for example Facebook™, Twitter™, Instagram™, or Pinterest™. In a particular arrangement, computing device 220 may comprise a software application installed thereon adapted to receive the promotion and link data and interact with the users preferred social media network directly from within the software application. In alternative arrangements, the software application adapted to receive the promotion and link data and is adapted to store this data and internal memory comprised within the computing device 220 such that the device is able to prepopulate a further software application comprised on the computing device, the further software application being specifically adapted to interact with the viewer's social media network of choice.

For example, the viewer may open a Twitter™ software application on their computing device 220 and may commence composing a tweet within the Twitter™ software application wherein the Twitter™ software application that that access the internal memory of the computing device 220 and to obtain promotion and/or link data associated with the media broadcast being watched by the viewer via media receiver (203 or 213).

Likewise, a user could open up eBay or Amazon type shopping application and pre-populate the search results with all products related to the piece of media they were consuming/selecting providing a traceable path to purchase back to the broadcaster/content creator. Likewise, Instagram™ or IMDB™ could pre-populate with the profiles of the cast and crew of the media amongst many other examples.

In a further example, the promotion and link data may comprise one or more HTML links to webpages associated with either the media broadcast being watched by the viewer and/or products or services referred to and/or contained within the media broadcast. In this example, the viewer may open a web browser on their computing device 220 wherein the web browser is adapted to access the internal memory to obtain the HTML link data from within the promotion data such that the viewer is able to select a desired link whereupon the Internet browser will retrieve the webpage associated with the selected HTML link.

Figure 3:
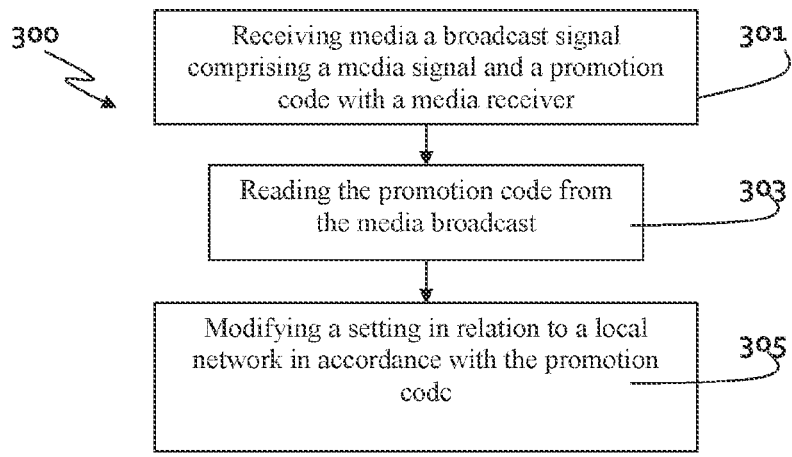
FIG. 3 shows a method 300 for providing a modified setting in relation to a local network for a network-enabled media receiver in accordance with a particular arrangement of the present invention.

Referring now to FIG. 3 there is shown a further aspect of the invention comprising a method 300 of providing a modified setting in relation to a local network for a network-enabled media receiver (203 or 213). As above, media receiver (such as for example 203 or 213 of FIG. 2) comprises a tuner module adapted to receive a broadcast signal 201. Method 300 comprises the step of receiving 301 media broadcast signal 201 comprising a media signal and a promotion code with media receiver (203 or 213). Method further comprises reading 303 said promotion code from said media broadcast and modifying a setting in relation to the local network, for example, the SSID associated with said media device in accordance with said promotion code.

Figure 4:
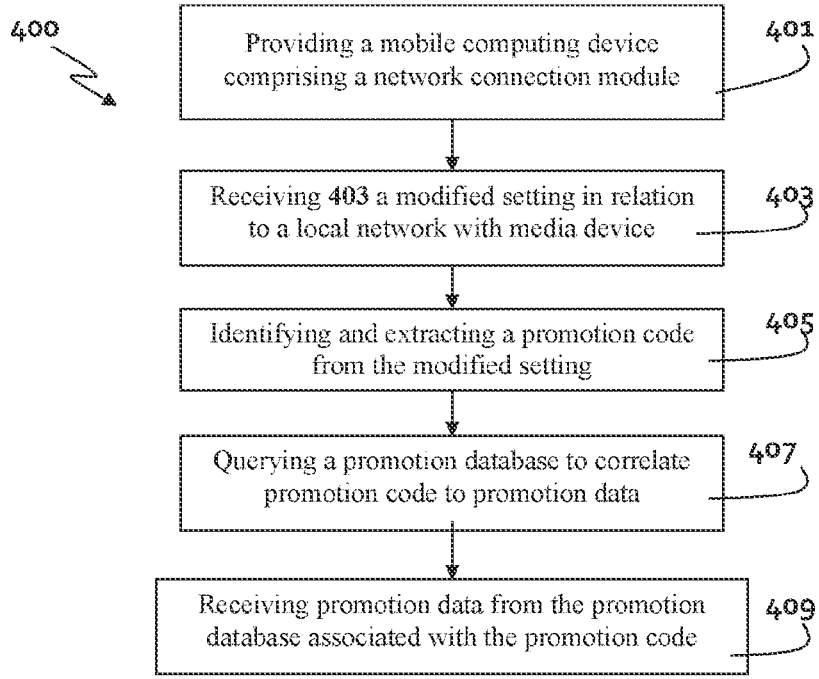
FIG. 4 shows a method 400 for enabling social engagement with an event in accordance with a particular arrangement of the present invention.

Referring now to FIG. 4 there is shown a further aspect of the invention comprising a method 400 of a method for enabling social engagement with a media broadcast. Method 400 comprises the step of providing 401 a computing device 220 comprising a network connection module. Computing device 220 may be any one of: a mobile computing device such as a smartphone or tablet device; or a personal computing device such as a desktop or laptop computer. Computing device (e.g. computing device 220 of FIG. 2) is adapted to connect to a local network and is further adapted to receive a modified setting in relation to the local network, for example, device identifier or SSID associated with a media device (such as for example 203 or 213 of FIG. 2) connected to the local network. Computing device 220 comprises a processor adapted to identify a promotion code within the modified setting (for example, the modified device identifier or SSID associated with media device (203 or 213). Method 400 further comprises the step of receiving 403 a modified setting, for example, the modified device identifier or SSID identifier associated with media device (203 or 213) and identifying and extracting 405 the promotion code from the modified setting. Method 400 further comprises the step of querying 407 a promotion database 240 via a public network such as the Internet 250 to correlate promotion code to promotion data; and receiving 409 promotion data from the promotion database 240 associated with the promotion code identified in the modified setting.

According to a further aspect, there is provided a modified device identifier associated with a media device (such as for example 203 or 213 of FIG. 2). The modified device comprises a first unique device identifier portion associated with the media device. The modified device identifier further comprises a second device identifier portion comprising a promotion code. The promotion code is extracted from a media broadcast signal received by a tuner module associated with the media device, wherein the promotion code is unique to the particular media broadcast being received by the tuner module of media device (203 or 213).

Time Stamping of Media Content

In particular arrangements, rather than having a single promotion code for a particular media program as discussed above, the media program may be separated into a plurality of segments or "Chapters", each segment having its own unique promotion code. Each segment of the media program may be identified by a timestamp within the media broadcast of the program. In particular arrangements the promotion code for each of the plurality of segments within the media program may be formed by the pending a further code to the original promotion code associated with the media program. For example, the promotion code for a particular media program may be "123456". In a particular arrangement, "chapters" or time segregated segments within the media program may be identified by a sequential numbering system within the media program, for example the first segment of media program may be associated with a promotion code such as "123456.1", the second segment with a code such as "123456.2", and so on. Alternatively, the plurality of segments or chapters within the many program may be identified by an objective measure associated with the media program itself, for example, the exact timestamp within the media program, for example the first media segment may be identified with a promotion code such as "123456.0" designating that the first segment starts at time "0 seconds", and a second subsequent segment or chapter of the media program may be identified with a promotion code such as "123456.1248" designating that the second segment commences at the 1248th second of the media program. In further arrangements still the promotion code may further include an additional identifier adapted to identify the particular broadcast network over which the media program is being broadcast, for example, if a media broadcast is provided by a broadcaster identified by their channel e.g. "Channel 7", the promotion code may, for example, be of the form "123456.1489.7" wherein the first portion of the code "123456" relates to the media program as a whole, the second portion of the promotion code "1489", being separated within the promotion code from other segments by the delimiter character "." relating to a time coded segment within the media program referring to for example a segment which commences 1489 seconds after the commencement of the media program. The third portion of the promotion code "7", again separated by the delimiter character "." associating the promotion code with the media broadcast station (Channel 7 in this case).

In further arrangements, individual users may be able to add their own customised chapter information to pre-existing media content. Such customised chapter information may be able to be shared (e.g. with the permission of the content owner) over social media channels to increase brand awareness & engagement with the media content. For example, a funny segment of the Jimmy Kimmel Show (the next instalment of mean tweets or a great interview) could be shared instantly by those watching to their friends, or a particularly funny or dramatic moment of a film could be shared by a user after watching a film, or for the purpose of creating a meme—again all for brand promotion—these could even be pre-selected moments that the content owner wants people to share to generate improved interest in their content. Such 'memorable moment' chapters could be created live and be made available to share within a brief period of time of the memorable moment occurring, for example a goal in a game of soccer could be 'shared' through a group chat on Wattsapp™ (so in the scenario where all the user's social media connections are watching a game of soccer and chatting on a group chat at the same time, as a goal is scored, users would be provided the option to insert a small clip of the goal or other memorable moment e.g. a penalty being awarded etc. could become available if authorised by the content owner or the broadcaster).

It will be appreciated that time stamping a plurality of segments within a media program may be applied retrospectively to existing recorded programs or retrospectively applied to existing digital transmissions, for example Youtube™ videos.

It will further be appreciated that additional or alternative time stamping nomenclature or systems may be utilised to uniquely identify individual segments or chapters within a particular media program, e.g. by the number of minutes elapsed rather than seconds, as would be appreciated by the person skilled in the art. For example, the plurality of segments within the media program may be broken up into segments of equal time with for example each five minute segment of the media program may comprise a unique promotion code. In this particular example, the timestamp information may be applied to a partially recorded program so that it's could still be accurately identified with relevant chapters applied at the right place once a specific time of the program is identified, for example, if a program is recorded missing the first 7 minutes, but a chapter is identified at minute 9, then the minute 9 marker could be used as a reference point to allow for timely and accurate application of all later chapter markers.

It will be further appreciated that the media receiver under control of the viewer may be adapted to permit the viewer to insert customised timestamp identifies within a media program such as a program digitally recorded by a media receiver capable of digitally recording media programs, and that the time stamping of the media program may be conducted at any time, either during an initial viewing of the media program, or retrospectively after the media program has finished.

As a particular example of a time-coded media program, this may be applied to a recording of a sporting program. As an example, particular noteworthy highlights within the sporting program may be identified by a timestamp associated with a promotion code specific to the media program. In this particular arrangement, such time stamps within the media program would enable the viewer to skip portions of the media program being not particularly noteworthy and skip directly to the noteworthy highlights of the sporting program within the program recording. In particular arrangements, a broadcaster or associated party may provide a list of timestamp information for a particular media program broadcast by the broadcaster such that the viewer may retrospectively download the timestamp information list from the broadcaster and apply the times and information list to a recording of the particular media program to which it relates.

A further example of a time-stamped media program may, for instance be a video providing recipe instructions for cooking a particular food item wherein the timestamp information may be adapted to permit the viewer to skip between particular steps within the food preparation process.

Banner Advertising

It will be readily appreciated by the person skilled in the art, that the above-mentioned system of applying time-coded promotion code information for a media program may be applicable to the presentation of advertising to the viewer, particularly on their computing device 220 which is connected to a local network and receiving network signals broadcast by the media receiver including such promotion codes as discussed above.

In this arrangement, the promotion code may be applied or utilised by browsers and other applications which incorporate banner advertising into those webpages or app designs. These banner ads could be adapted to recognise the promotion code in a similar manner to that described above whereby the querying of the promotion database for promotion data or link data associated with the promotion code may result in the web browser being provided with link data referring to banner advertisements which are relevant to the content of the webpage or some other particular type of content being consumed by the particular user of the web browser. As a particular example, a user may be watching an episode of a lifestyle or reality television program on a media receiver whilst simultaneously browsing the Internet using a web browser that is adapted to receive and recognise promotion codes associated with the lifestyle or reality television program. In this example, as the user is browsing in the web browser, the web browser may be configured to display advertisements associated with the lifestyle or media program being concurrently viewed by the user.

Media Receiver Configuration

As would be appreciated by the skilled addressee, the above systems and methods would likely require a modification to the firmware and/or operating software code associated with the media receiver in order to a) recognise and extract the promotion code from the broadcast signal being received by the media receiver, and b) appending the promotion code to the unique setting for example, device identifier or SSID associated with the media receiver such that the media receiver is able to broadcast the promotion code to the local network. It is envisaged that such modification of the firmware and/or operating software code of the media receiver could be put into effect by a routine upgrade to the firmware of the media receiver for example via commonly distributed firmware upgrade methods such as via either an upgraded firmware file downloaded from an Internet accessible website for routinely pushed out by a hardware manufacturer to media receivers produced by such hardware manufacturers over a public network such as the Internet.

In preferred arrangements is envisaged that an industry standard (e.g. an IEEE standard) for presentation and inclusion of promotion codes within a media broadcast be developed such that a common standard is applied amongst all media broadcasters such that a single media receiver is able to accurately interpret the promotion codes from any particular media broadcast received by any of such broadcasters.

In further arrangements to the above-described system, the system may additionally be adapted to provide promotion data and/or link data in association with a particular user accessing a mobile computing device or the like.

Figure 5:
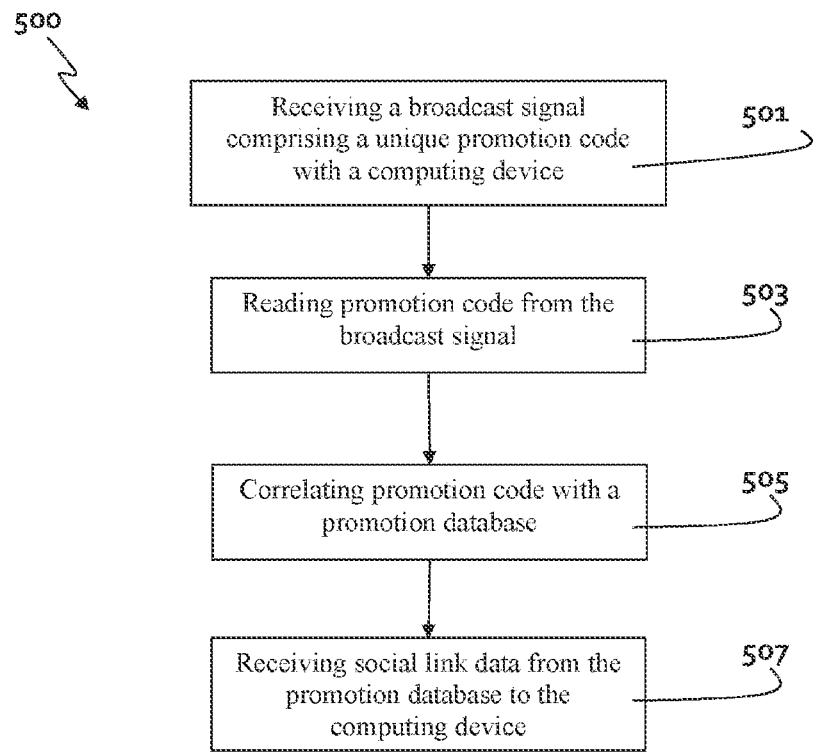
FIG. 5 shows a method 500 for enabling social engagement with an event in accordance with a further arrangement of the present invention.

FIG. 5 shows a method 500 for enabling social media interaction with an event in accordance with this arrangement. Method 500 comprises receiving 501 a broadcast signal comprising a unique promotion code with a computing device. The promotion code is unique to the event. Method 500 further comprises reading 503 the unique promotion code from the broadcast signal. The computing device comprises a processor adapted to read the promotion code from the broadcast signal. In this arrangement, the broadcast signal is a local broadcast signal such as a hotspot, for example the local broadcast signal may be associated with a local network.

The processor is further adapted to query the promotion database utilising a public network such as the internee to correlate the promotion code to social and or link data associated with the media program or event. Method 500 comprises correlating 505 the promotion code with a promotion database. Method 500 further comprises receiving 507 social link data from the promotion database to the computing device. The computing device is adapted to provide user engagement with the link data.

Figure 6:
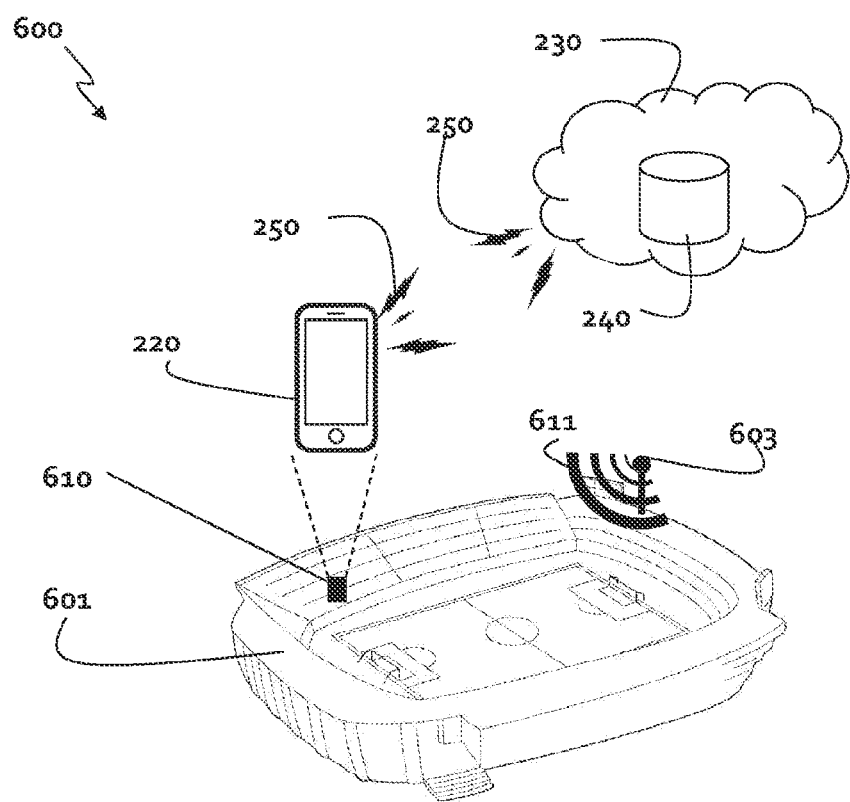
FIG. 6 shows a further system 600 adapted to implement method 100 of FIG. 1.
Figure 7:
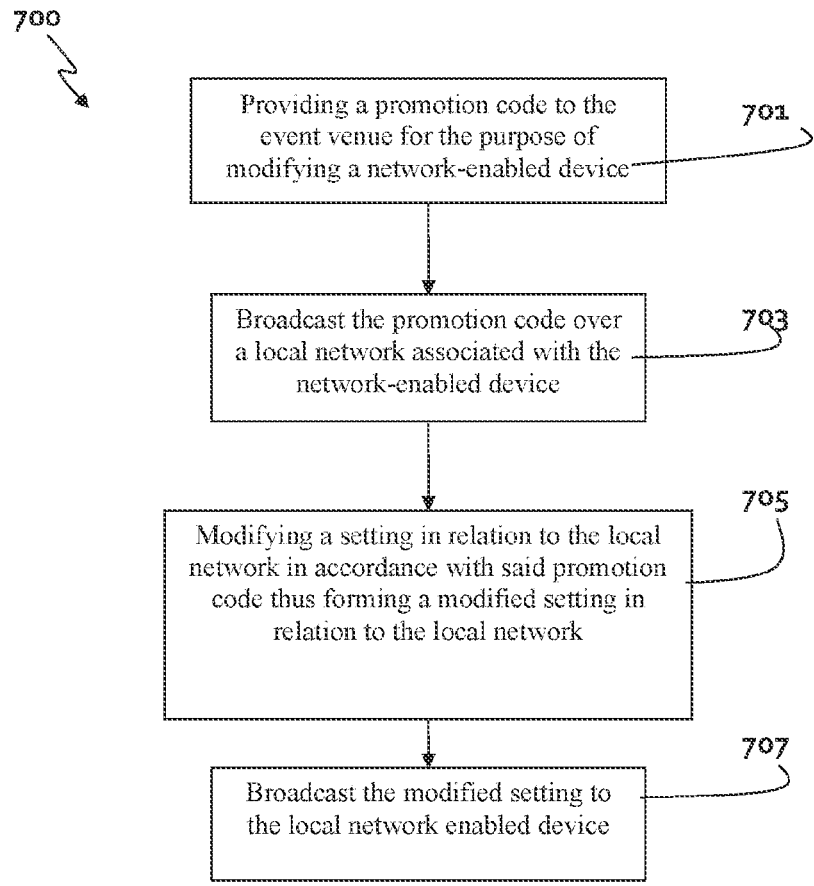
FIG. 7 shows a method 700 for providing a modified setting in relation to a local network for a network-enabled device in accordance with a further arrangement of the present invention.

As an example of method 500, rather than a media receiver broadcasting a modified setting for example, device identifier or SSID, a particular venue may broadcast a similarly modified setting such that it is accessible to visitors located at the sporting venue such as, for example spectators of a sporting match such as system 600 depicted in FIG. 6. In accordance with this arrangement, there is provided method 700 depicted in FIG. 7 of providing a method for providing a modified setting in relation to a local network for a network-enabled device such as an IEEE 802.11 enabled or a zero configuration network-enabled device associated with the venue. The method comprises providing 701 a promotion code to the event venue for the purpose of modifying a network-enabled device such that it is able to broadcast 703 the promotion code over a local network associated with the network-enabled device. The method further comprises modifying 705 the setting in relation to the local network, for example, an existing device identifier or SSID associated with network-enabled device in accordance with said promotion code thus forming a modified setting for example, a modified device identifier or SSID. The modified setting is then broadcast 707 via the local network associated with the network-enabled device.

Referring back to FIG. 6, in this example, the stadium or venue 601 includes a broadcast antenna 603. In particular arrangement, broadcast antenna 603 is configured to act as a wireless internet Wi-Fi 'hotspot' and is adapted to broadcast and receive wireless network communication signals with users 610 within the venue 601. Similarly, to the above system, the venue hotspot broadcasts a unique device identifier, particularly, an SSID in this example, for identifying the hotspot to mobile communication devices (e.g. smartphones, tablet computes and the like) located in the vicinity of the venue 601. In the present arrangement, the hotspot broadcasts a network signal 611 (i.e. similar to the local network signal 611 broadcast by the media receiver as shown in FIG. 2) comprising a modified SSID identifier, the modified SSID comprising at least two portions: a first portion identifying the hotspot network (e.g. "Etihad_Stadium") and a second portion separated from the first portion by a delimiter character, the second portion comprising a venue promotion code uniquely associated with the event occurring in real-time (e.g. "ARL_EelsvStorm_Rnd1" in relation to an Australian rugby league football match currently being played at the venue 601) match at the venue 601. As will be appreciated by the skilled addressee, the SSID, and/or any of the different portions of the SSID as described herein, may comprise any suitable format such as a purely numerical format in accordance with requirements. As before, the venue promotion code is to be associated with promotion data or link data relevant to one or more of: information regarding the sporting venue itself or promotion data or link data associated with the particular activity being undertaken at the venue at that time. A spectator (e.g. located within the stadium at location 610) watching the match and in possession of a network-enabled mobile computing device 220 (e.g. smartphone or tablet device) is able to receive the modified. SSID signal 611 broadcast by antenna 603 (note the spectator does not need to be actually connected to the hotspot local wireless network provided by the venue they just require a device able to receive and interpret the modified SSID signal 611). As before, computing device 220 comprises a processor adapted to query a lookup database such as promotion database 240 to correlate the unique venue promotion code with venue promotion data comprised in promotion database 240. Venue promotion database 240 is advantageously comprised on a network accessible computing device such as, for example cloud server 230 or the like, wherein promotion database 240 is able to be accessed via a public network such as the Internet 250.

Other examples of venue applications of the method 500 include, for example:

In the case of a football match being played at the venue 601, the venue promotion data may include data relating to: social media data associated with the sporting teams and or individual players participating in the match; link data associated with official websites of the teams and/or players; links to shopping websites adapted to offering merchandising associated with the sporting match; etc.

In the case of a music event occurring at venue 601 (e.g. a music concert, variety concert or the like), the venue promotion data may include data relating to social media data associated with the performing artist(s), link data associated with official websites of the artist(s) and/or their associated recording studio labels; link data to websites offering associate merchandising or links to be able to purchase a copy of music being performed by the artist(s)—it will be appreciated that, with the addition of time-stamped promotion codes, the promotion data may be adapted to provide relevant data to the music being performed at any particular time.

In the case where venue 601 is adapted for alternate entertainment purposes for consumption by viewers e.g. plays, opera, dance performances; or alternatively for socialising venues such as bars or clubs etc., the venue promotion data may include data relating directly to the work being performed (e.g. history, creators, composers, writer etc. in an example, for a performance of Hamlet, the promotion data may include the a link to Shakespeare's biography, history of the play e.g. the year it was written and any interesting related trivia), or to the company which has put on the work (e.g. the theatre or dance company etc.) or to the individual participants (actor's, dancer's social media connection data, biography etc.) as would be appreciated by the skilled addressee. Where the venue is that is a socialising venue such as the power or club the promotion data may provide social media data associated with the bar or club and/or the proprietors of the club, or alternatively or additionally may comprise promotion data relation to particular promotional events being run by the bar or club such as for example happy hour drink specials, discounts on food items for sale at the bar or club, etc.

Entertainment venues such as, for example, bowling alleys, arcades, laser-tag, putt putt, carnivals and fairs: A user could obtain information relating to their time at the venue—e.g. get your score or interact with the bowling alley, putt-putt venue. If there the venue provides shareable content (e.g. video footage of a bowling lane which a user could access and share footage, for example, of a strike on their preferred social media network e.g. Instagram™ or Snapchat™, or post their score to Facebook™). A user at a carnival or theme park could obtain footage or images of themselves on a rollercoaster and have it shared directly to their phone or posted on their preferred social media network.

At a bar or club: via ".Allt" promotion codes distributed by a hotspot associated with the club, a user could, for example, select music to be played in the venue or offer feedback to the DJ for the next song, link to a menu associated with the venue to order food or drinks through their mobile computing device, use their device as a tag for receiving alerts from the venue, such as when a food order is ready for collection, have drinks sent to you from friends either within the same venue or at distance venues e.g. overseas or at another venue, or share a bar-tab, among many others Hot-Spotting:
  Live music at a bar—using a phone as a WIFI hotspot a
    band can share their music or allow a purchase direct
    from iTunes or a user could find them on Instagram/
    Facebook/Twitter/Snapchat etc. allowing the band to
    instantly connect at the time, or any time afterwards
    with their audience.
  This concept would be extended to the university model
    disclosed above where on a small local network a
    professor could take roll call of a class using Allt and
    at the same time share notes etc. of the class for the day.
  Further extensions could be photographers at an event or
    even on a ski-field hot-spotting themselves so that if a
    user wanted to find the photos of themselves that were
    taken the user only needs to search that hotspot Allt
    code (could be on photographers business card or the
    photographer could share it instantly via Allt without
    the user having to provide their personal details).
  Likewise at a wedding, for example, the bride and groom
    could setup a specific promotion code for their wedding
    which is provided to the wedding reception venue to be
    broadcast to wedding guests over a hotspot provided by
    the reception venue or even a hotspot WIFI on a
    personal mobile computing device—this could be used
    for example such that all photos the reception attendees
    take, or have taken on connected devices can be automatically linked to an event—related website e.g. on a
    social media platform e.g. a Facebook™ event page
    etc.
Localised advertising for national companies e.g. an advertisement for a local retailer e.g. Target™ during a media
    broadcast of a sporting event e.g. the AFL grand final—if
    a user interacts with the media content, the GPS in the
    user's smartphone could automatically sync to the nearest
    Target™ store and provide details of specials currently in place for that retailer store—this could be extended to also include shops or malls offering specific specials based on something a user had seen on TV or interacted with . . . e.g. if a user has previously searched for a pair of shoes and then walked into or nearby to a store that sold them, the store or mall could direct the user to those particular shoes or that store or may even be adapted to alert the user that the searched-for item is on special now or comes with a special deal.

If a user views an advertisement for a TV show they could set a reminder to themselves to watch the show or send to their IoT smart TV, or via a broadcast service example PayTV broadcaster Foxtel™ in Australia) application to auto-record a desired program User Interaction with street advertising: should the advertising location be able to broadcast any type of signal it would be stored in the history and be immediately searchable to find the model used in the advert. Find the product. Find the clothes or any other element contained within the advertisement. Likewise a retailer may broadcast network information (e.g. a WWI hotspot) so that when a user walked past the retailer, their mobile computing device (tablet or smartphone) would see the SSID of the retailer hotspot and their device could be adapted to recognise and read the promotion code attached to the retailer SSID and download related link data to the device which can be stored in device memory to be recalled by the user at a later time. For example, a Flight Centre™ retailer may provide a hotspot network broadcasting a modified SSID, a user whom had walked past the retailer store such that their mobile device received the broadcast promotion code would be able to recall the flight offers and even book direct through the Flight Centre™ mobile application.

Restaurant: Users could obtain social media profile and link data associated with the restaurant such that they would be empowered to Instagram their food order from the menus or share a promotional shot of the food or cocktail that they had ordered among their social media networks (e.g. Instagram or Facebook)—Also discounts or specific promotional material could then be attached . . . for example, a social media post may be of the form: "Your friend had this breakfast at [X Restaurant] today, come within the next week and get 10% off" or similar. That is, the venue would be able to encourage among their patrons the sharing of photos or experiences to generate wider interest or to promote themselves via the person sharing the image of their food.

Enhanced cinema experience: Movie makers could provide specific content available to cinema goers once the viewer has seen the film. This could include promotional imagery or audio or video content that could be shared via social networks to help promote the feature. This would be in addition to the products and other promotional elements already available through normal promotion code link data. This specific content could include phone themes or backgrounds, ringtones or message alerts, specific short clips (preferably not 'spoilers' but rather funny or critical moments in a film that could become 'meme's' that will hopefully go viral). Attendance at the cinema could also allow the user to obtain a copy of the film, or pre-pay for a copy of the film to be immediately sent to them upon its digital/commercial in-store release or even pre-reserve the pay-per-view for when it comes out on TV/cable. Subsequent viewings could even be tallied and the more a user sees a film at the cinema, the cheaper future product offerings could be made.

The SSID feature for a venue will allow for apps and devices to recognise when a user is in a particular location and offer up features related to that venue or site; likewise tickets and other such pre-purchases that would not be relevant until the user has arrived at the location where the ticket would be used could become available once the user is within range of the venue. Although this feature exists using GPS it is limited by said availability in that GPS is not always accurate or even functioning should the venue be underground or within a shopping centre etc. The modified SSID of a venue could be linked to a ticket to automatically become available as soon as the venue code is identified by the user's mobile computing device once they are in range of the venue (i.e. sufficiently close enough to the venue for their mobile computing device to be within range of the venue's WIFI broadcast including the modified SSID code). This particular example would be an additional advantage over the GPS function in that the user's mobile computing device (and the software applications installed on the device) could interact with the venue, thus allowing the venue to offer promotions to the user or for internal data reporting by the venue, e.g. recording and manage attendance figures and the like.

In a further arrangement, the promotion codes may be applied retrospectively to existing media programs. For example, a promotion database provider may retrospectively compile social media and/or link data associated with existing media programs, and this may be made available to users of a software application adapted to process such promotion data to obtain the social media and link data relating to the media program. This particular aspect may be particularly advantageous in the case where a promotion code is associated with highlights of a sporting event such as a football match so that a user of the software application may be able to access relevant social media data and/or link data in relation to the sporting event or even to particular highlights of the event.

In a particular arrangement, this backward compatibility for existing programs may be implemented as a procedure which is adapted to scan existing media (e.g. video) libraries and recordings and attempt to identify the piece of media. The procedure may further comprise associating an identified media file with a customised promotion code file in a similar manner as a media file can be associated with a text file (having e.g. a filename extension of the form ".srt") to provide written subtitles overlaid on the video image during payback and time-synchronised with the media file. A possible suggestion for such a file may have a filename extension of the form ".Allt" which provides time-synchronised promotion codes to the media receiver or playback module adapted to view the tile, such that the media receiver broadcasts the promotion codes from the .Allt file in the same manner as described above. As would be readily appreciated by the skilled addressee, this arrangement would allow an existing piece of media to be backwards formatted for inclusion of promotion codes related to the video or media file and time-synched with the content therein. A significant advantage of this particular arrangement, is that it will allow the original creators and owners of the content to capitalise on existing media (e.g. video) libraries people already have. Additionally, the original content creators and owners would be able to recover additional revenue from illegally downloaded programs . . . . In an example, a particular user may have a downloaded file of the movie "Die Hard" in their media collection. The user would be able to download a ".Allt" file for that movie so that, if they wanted to find some memorabilia, or dress up like John McClaine for a fancy dress, or buy the Christmas rap song at the beginning, then they would be able to use the promotion codes from the correlated ".Allt" file broadcast by their media player and received on their mobile computing device as they watch the program. Thus, if the user was ever prompted to make a purchase on items related to the movie and found using the ".Allt" promotion codes, the purchase would generally be able to be traced back to the original content provider who could then claim a commission on the sale from the seller.

Additional use cases may optionally include:
connected street advertising for example to direct an observer in the vicinity of say, a billboard or poster advertisement, to additional information related to the product being advertised, or even to the social media profiles of the models appearing in the advertisement
if for a TV show set a reminder to yourself to watch the show (or send to your IoT smart TV, or via a broadcast service (for example PayTV broadcaster Foxtel™ in Australia) application to auto-record a desired program),
within shopping malls (maybe special promotions could be picked up by a shopper as they enter the centre;
universities or schools (a lecturer can share the class notes from the day direct to a student's laptop or phone or to provide link data to direct the student to a particular site to download additional course materials or even take roll call through integration with a specific software application installed on the phone or tablet device of each student;
bar and clubs would be able to provide promotional material to patrons without requiring a sign-up procedure;
among many others, as would be appreciated by the skilled addressee.

Computing Device

Figure 8:
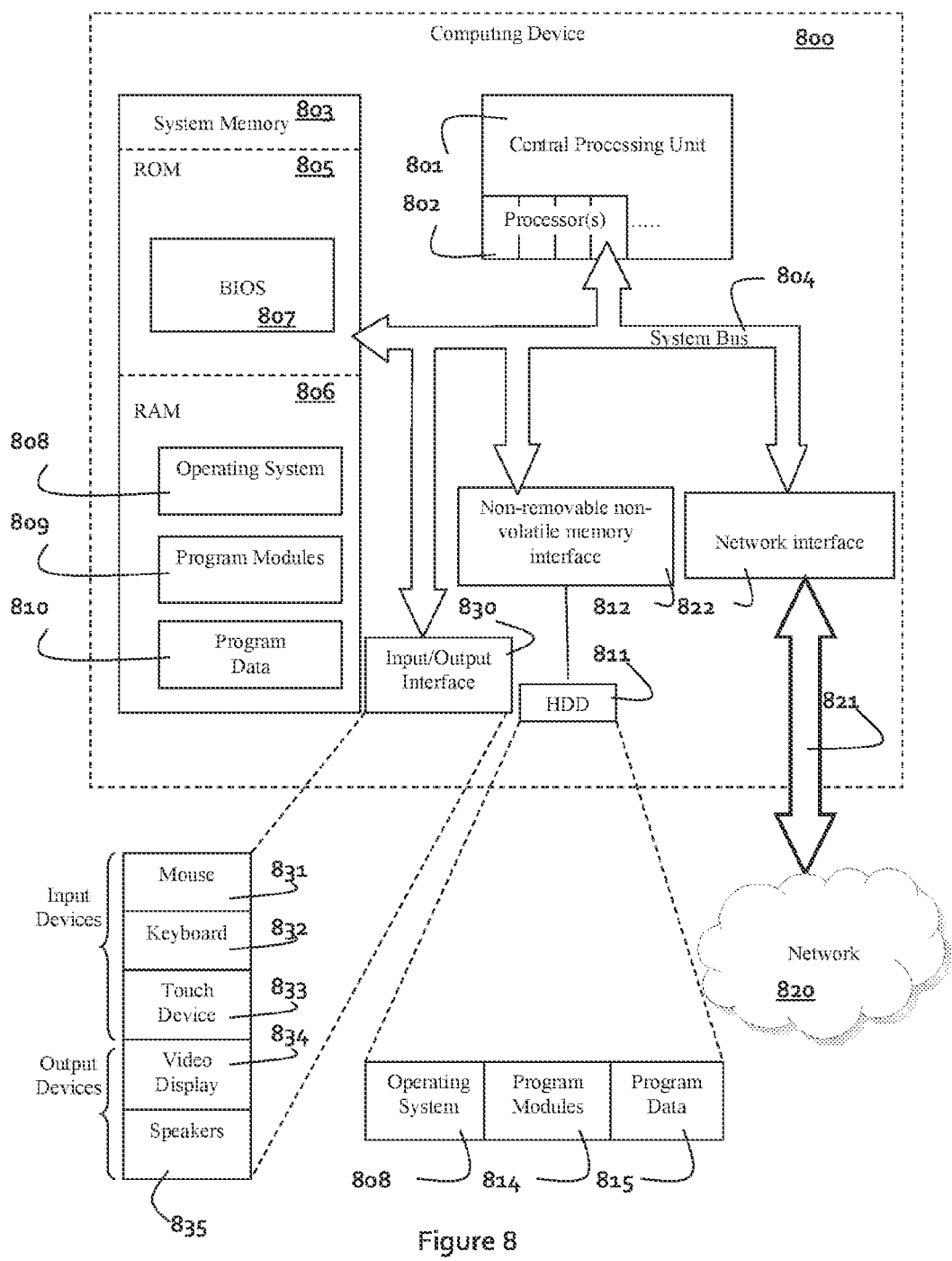
FIG. 8 shows a system computing device 800 on which the various embodiments described herein may be implemented in accordance with an embodiment of the present invention.

The methods disclosed herein (e.g. method(s) 100, 300, 400, 500 and 700 depicted respectively in FIGS. 1, 3, 4, 5 and 7) may be implemented using a computing device/computer system 800, such as that shown in FIG. 8 wherein the processes of FIGS. 1, 3, 4, 5 and 7 may be implemented as software, such as one or more application programs executable within the computing device 800. In particular, the steps of methods 100, 300, 400, 500 and 700 are effected by instructions in the software that are carried out within the computer system 800. The instructions may be formed as one or more code modules, each for performing one or more particular tasks. The software may also be divided into two separate parts, in which a first part and the corresponding code modules performs the described methods and a second part and the corresponding code modules manage a user interface between the first part and the user. The software may be stored in a computer readable medium, including the storage devices described below, for example. The software is loaded into the computer system 800 from the computer readable medium, and then executed by the computer system 800. A computer readable medium having such software or computer program recorded on it is a computer program product. The use of the computer program product in the computer system 800 preferably effects an advantageous apparatus for providing a means for broadcasters and/or business providers to promoting increased brand awareness and enabling a viewer consuming media content to engage in increased brand interaction between a person that is consuming the media content and the media program being viewed.

With reference to FIG. 8, an exemplary computing device 800 is illustrated. The exemplary computing device 800 can include, but is not limited to, one or more central processing units (CPUs) 801 comprising one or more processors 802, a system memory 803, and a system bus 804 that couples various system components including the system memory 803 to the processing unit 801. The system bus 804 may be any of several types of bus structures including a memory bus or memory controller, a peripheral bus, and a local bus using any of a variety of bus architectures.

The computing device 800 also typically includes computer readable media, which can include any available media that can be accessed by computing device 800 and includes both volatile and non-volatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash-memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 800. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 803 includes computer storage media in the form of volatile and/or non-volatile memory such as read only memory (ROM) 805 and random-access memory (RAM) 806. A basic input/output system 807 (BIOS), containing the basic routines that help to transfer information between elements within computing device 800, such as during start-up, is typically stored in ROM 805. RAM 806 typically contains data and/or program modules that are immediately accessible to and/or presently being operated on by processing unit 801. By way of example, and not limitation, FIG. 8 illustrates an operating system 808, other program modules 809, and program data 810.

The computing device 800 may also include other removable/non-removable, volatile/non-volatile computer storage media. By way of example only, FIG. 8 illustrates a hard disk drive 811 that reads from or writes to non-removable, non-volatile magnetic media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 811 is typically connected to the system bus 804 through a non-removable memory interface such as interface 812.

The drives and their associated computer storage media discussed above and illustrated in FIG. 8, provide storage of computer readable instructions, data structures, program modules and other data for the computing device 800. In FIG. 8, for example, hard disk drive 811 is illustrated as storing an operating system 808, other program modules 814, and program data 815. Note that these components can either be the same as or different from operating system 808, other program modules 809 and program data 810. Operating system 808, other program modules 814 and program data 815 are given different numbers hereto illustrate that, at a minimum, they are different copies.

The computing device also includes one or more input/output (I/O) interfaces 830 connected to the system bus 804 including an audio-video interface that couples to output devices including one or more of a video display 834 and loudspeakers 835. Input/output interface(s) 830 also couplets) to one or more input devices including, for example a mouse 831, keyboard 832 or touch sensitive device 833 such as for example a smartphone or tablet device.

Of relevance to the descriptions below, the computing device 800 may operate in a networked environment using logical connections to one or more remote computers. For simplicity of illustration, the computing device 800 is shown in FIG. 8 to be connected to a network 820 that is not limited to any particular network or networking protocols, but which may include, for example Ethernet, Bluetooth or IEEE 802.X wireless protocols. The logical connection depicted in FIG. 8 is a general network connection 821 that can be a local area network (LAN), a wide area network (WAN) or other network, for example, the internet. The computing device 800 is connected to the general network connection 821 through a network interface or adapter 822 which is, in turn, connected to the system bus 804. In a networked environment, program modules depicted relative to the computing device 800, or portions or peripherals thereof, may be stored in the memory of one or more other computing devices that are communicatively coupled to the computing device 800 through the general network connection 821. It will be appreciated that the network connections shown are exemplary and other means of establishing a communications link between computing devices may be used.

Interpretation

Social Network

The term social network as used herein comprises a social network is a social structure made up of a set of social actors (such as individuals or organizations), sets of dyadic ties, and other social interactions between actors. The social network may in an arrangement be an online eco-system including data structure comprising one or more connections describing the relationships between individuals connected and or participating in the social network and is defined explicitly by the one or more connections. Examples of common social networks include Facebook™, Twitter™, Instagram™, Pinterest™ and the like.

Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the team "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment/arrangement of each of the methods described herein is in the form of a computer-readable carrier medium carrying a set of instructions, e.g., a computer program that are for execution on one or more processors. Thus, as will be appreciated by those skilled in the art, embodiments/arrangements of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment/arrangement or an embodiment/arrangement combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment/arrangement to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment/arrangement by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments/arrangements are described herein as a method or combination of elements of a method that can be implemented by a processor or a processor device, computer system, or by other means of carrying out the function. Thus, a processor with the necessary instructions for carrying out such a method or element of a method forms a means for carrying out the method or element of a method. Furthermore, an element described herein of an apparatus embodiment/arrangement is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments/Arrangements

Reference throughout this specification to "one embodiment", "an embodiment", "one arrangement" or "an arrangement" means that a particular feature, structure or characteristic described in connection with the embodiment/arrangement is included in at least one embodiment/arrangement of the present invention. Thus, appearances of the phrases "in one embodiment/arrangement" or "in an embodiment/arrangement" in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more embodiments/arrangements.

Similarly, it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments/arrangements described herein include some, but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the mobile device industries, specifically for methods and systems for distributing digital media via mobile devices.

It will be appreciated that the methods/apparatus/devices/systems described/illustrated above at least substantially provide systems and methods for promoting increased brand awareness and enabling a viewer consuming media content to engage in increased brand interaction.

The systems and methods described herein, and/or shown in the drawings, are presented by way of example only and are not limiting as to the scope of the invention. Unless otherwise specifically stated, individual aspects and components of the systems and methods may be modified, or may have been substituted therefore known equivalents, or as yet unknown substitutes such as may be developed in the future or such as may be found to be acceptable substitutes in the future. The systems and methods may also be modified for a variety of applications while remaining within the scope and spirit of the claimed invention, since the range of potential applications is great, and since it is intended that the present systems and methods be adaptable to many such variations.

The invention claimed is:

1. A method for brand promotion comprising the steps of:
receiving a media broadcast signal comprising a media signal and a unique promotion code with a media receiver that acts as a network element in a zero configuration network operating under a Universal Plug and Play (UpnP) protocol;
reading, by the media receiver, said unique promotion code from said media broadcast signal;
modifying, by the media receiver, a device name setting in a UPnP device description file in relation to the zero configuration network by incorporating said unique promotion code in an existing name value of the receiver device in the device name setting, thereby generating a modified UPnP device description file;

broadcasting, by the media receiver, the modified UPnP device description file with the modified device name setting that incorporates said unique promotion code using the UPnP protocol in the zero configuration network associated with the media receiver;

receiving the modified UPnP device description file with the modified device name setting that incorporates said unique promotion code with a computing device;

extracting, by the computing device, said unique promotion code from the modified device name setting in the modified UPnP device description file;

correlating, by the computing device, said unique promotion code with social link data in a promotion database; and receiving, by the computing device, said correlated social link data from the promotion database, wherein the computing device is adapted to provide user engagement with the social link data.

2. The method as claimed in claim 1, wherein the media broadcast signal comprises a television broadcast signal.

3. The method as claimed in claim 2, wherein the method further comprises:

extracting, at the media receiver, said unique promotion code from within said television broadcast signal.

4. The method as claimed in claim 3, wherein the method further comprises:

connecting said media receiver to the zero configuration network.

5. The method as claimed in claim 4, wherein the method further comprises:

querying, by the computing device, a lookup database to correlate said unique promotion code with promotion data.

6. The method as claimed in claim 5, wherein said lookup database comprises said promotion data.

7. The method as claimed in claim 6, wherein the method further comprises:

receiving at said computing device, said promotion data from said lookup database.

8. The method as claimed in claim 7, wherein said promotion data comprises social link data.

9. The method as claimed in claim 1, wherein the unique promotion code is uniquely associated with a media program at the time of creation of the media program.

10. The method as claimed in claim 1, wherein the unique promotion code comprises an editable promotion code segment adapted to be edited to comprise a broadcaster promotion code uniquely associated with a media broadcaster.

11. The method as claimed in claim 10, wherein the method further comprises:

broadcasting, from the media broadcaster, the media signal and the associated broadcaster promotion code; and simultaneously broadcasting, from the media broadcaster, a further broadcast signal comprising a broadcaster promotion code uniquely associated with the media broadcaster.

12. The method as claimed in claim 11, wherein the method further comprises:

combing, at the media receiver, the unique promotion code and the broadcaster promotion code to form the modified a device name setting in relation to the zero configuration network for broadcast via said zero configuration network by said media receiver.

* * * * *